(12) United States Patent
Seong et al.

(10) Patent No.: US 8,026,850 B2
(45) Date of Patent: Sep. 27, 2011

(54) APPARATUS AND METHOD FOR COMPUTING LOCATION OF A MOVING BEACON USING TIME DIFFERENCE OF ARRIVAL AND MULTI-FREQUENCIES

(75) Inventors: Nak-Seon Seong, Daejon (KR); Choon-Sik Lim, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 419 days.

(21) Appl. No.: 12/096,777

(22) PCT Filed: Dec. 8, 2006

(86) PCT No.: PCT/KR2006/005331
§ 371 (c)(1), (2), (4) Date: Jun. 9, 2008

(87) PCT Pub. No.: WO2007/067007
PCT Pub. Date: Jun. 14, 2007

(65) Prior Publication Data
US 2008/0291089 A1 Nov. 27, 2008

(30) Foreign Application Priority Data
Dec. 8, 2005 (KR) .......................... 10-2005-0119623

(51) Int. Cl.
*G01S 1/24* (2006.01)
(52) U.S. Cl. ...................................................... 342/387
(58) Field of Classification Search .......... 342/385–387, 342/450–465, 219, 363
See application file for complete search history.

(56) References Cited

U.S. PATENT DOCUMENTS

| | | | |
|---|---|---|---|
| 5,596,330 A * | 1/1997 | Yokev et al. | 342/387 |
| 5,724,047 A | 3/1998 | Lioio et al. | |
| 6,658,258 B1 | 12/2003 | Chen et al. | |
| 2004/0102196 A1 | 5/2004 | Weckstrom et al. | |
| 2006/0166681 A1 * | 7/2006 | Lohbihler | 455/456.2 |

FOREIGN PATENT DOCUMENTS

| | | |
|---|---|---|
| KR | 10-1999-0026368 | 4/1999 |
| KR | 10-2002-0002936 | 10/2002 |
| KR | 10-2005-0071242 | 7/2005 |
| KR | 10-2007-0064255 | 6/2007 |

OTHER PUBLICATIONS

Location-Aware 433 MHz Air Interface For ISO 24730-3 in 2005 ISO JTC1 SC4 WG5, p. 1 through 15, dated Nov. 4, 2005.
International Search Report for corresponding to PCT/KR2006/005331 Dated Mar. 6, 2007.

* cited by examiner

*Primary Examiner* — Thomas Tarcza
*Assistant Examiner* — Nga X Nguyen
(74) *Attorney, Agent, or Firm* — Kile Park Goekjian Reed & McManus PLLC

(57) ABSTRACT

Provided is an apparatus and method for computing the location of a radio beacon by using Time Difference Of Arrival (TDOA) and multiple frequencies. The apparatus and method of the present invention compute the location of a radio beacon without limitation in distance by using multiple frequencies and time difference of arrival to resolve the problem of phase ambiguity. A radio beacon location computing system includes a plurality of base stations configured to receive signals of multiple frequencies transmitted from the radio beacon, and detect and output phase differences and arrival time; and a location computing server configured to receive the phase differences and the arrival time outputted from the respective base stations, acquire calculation distances based on the phase differences, remove phase ambiguity from the calculation distances based on the arrival time, and compute the location of the radio beacon.

9 Claims, 5 Drawing Sheets

APPARATUS AND METHOD FOR COMPUTING LOCATION OF A MOVING BEACON USING TIME DIFFERENCE OF ARRIVAL AND MULTI-FREQUENCIES

TECHNICAL FIELD

The present invention relates to a radio beacon location computing apparatus and method for determining the location of a radio beacon; and, more particularly, to a radio beacon location computing apparatus that can determine the location of a radio beacon by receiving signals transmitted from the radio beacon at a plurality of base stations and using Time Difference Of Arrival (TDOA) information and phase difference information of the received signals, and a method thereof.

BACKGROUND ART

A general method of tracing the location of a radio beacon will be described hereinafter with reference to the accompanying drawings.

FIG. 1 is an exemplary view showing a typical radio beacon location computing system.

Referring to FIG. 1, a radio beacon 100 transmits signals in two or more frequencies f1 and f2, which are independent from each other. Then, at least three base stations 111, 112 and 113 receive the signals in the two frequencies, extract phase differences ΔΦ1, ΔΦ2 and ΔΦ3 based on a transmission distance in phase difference calculator 141, 142 and 143, and computes the location of the radio beacon 100 in the location computing server 120 based on the extracted phase differences to thereby compute and determine the location of the radio beacon 100.

Generally, the method that a radio beacon transmits signals in two or more frequencies and base stations receive the radio signals and compute a distance by calculating a phase difference based on a frequency interference phenomenon has a problem that the calculation for acquiring a distance between a base station and a radio beacon produces a plurality of solutions where the phase differences between the two frequencies are ΔΦ, 2π+ΔΦ, 4π+ΔΦ, . . . due to ambiguity of a phase repeating at a period of 2π.

Accordingly, the conventional radio beacon location tracing method using more than two different frequencies and a phase difference thereof has a limited coverage, which is an area where the phase difference between the two frequencies is smaller than 2π. Thus, the conventional method cannot be applied to an environment where the coverage is larger than the phase difference of the two frequencies, i.e., 2π.

Hereinafter, the conventional radio beacon location computing method using two frequencies will be described with reference to FIG. 2.

FIG. 2 is a diagram illustrating ambiguity in location computation (positioning ambiguity) caused by phase ambiguity.

One radio beacon (TS) 100 transmits radio signals by using two frequencies, and base stations RS1, RS2 and RS3 111, 112 and 113 covering the area where the radio beacon 100 is disposed measure the phase difference between the two frequencies and computes the distance to the radio beacon 100. The measured phase differences ΔΦ1, ΔΦ2 and ΔΦ3 correspond to distances R1, R2 and R3 210, 220 and 230, respectively. When circles are drawn by taking the distances as radiuses, an intersection 240 where the three circles meet is determined as the location of the radio beacon 100.

However, when it is assumed that only the base station RS1 111 has phase ambiguity, it is possible to predict that the radio beacon 100 exists at a location where the phase difference of the two frequencies is 2π+ΔΦ1. Thus, a circle having a distance R1 211 corresponding to 2π+ΔΦ1 as its radius can be drawn. This method yields a solution of another location 250 where circles having the distances R2 and R3 220 and 230 from the base station RS2 112 and the base station RS3 113 meet.

Therefore, there is a problem that the accurate location of the radio beacon 100 cannot be detected in an area where the phase difference between the two frequencies is larger than 2π.

To sum up, since the conventional location computing method using more than two frequencies and phase difference at a location where the frequencies arrive may produce a plurality of solutions due to the phase ambiguity, it should be used within an area where the phase difference between the two frequencies is less than 2π. The limitation in distance draws back the location computation of a radio beacon from enlarging into an area where the phase difference between the two frequencies is larger than 2π.

DISCLOSURE

Technical Problem

It is, therefore, an object of the present invention to provide a radio beacon location computing apparatus that can compute the location of a radio beacon without limitation in distance by using Time Difference Of Arrival (TDOA) to resolve a phase ambiguity problem occurring in a location computing method using multiple frequencies, and a method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a method for computing a location of a radio beacon by using Time Difference Of Arrival (TDOA) and multiple frequencies, comprising the steps of: a) receiving signals of multiple frequencies in a plurality of base stations from the radio beacon and acquiring arrival time (t1, . . . , tn) of the received signals; b) receiving phase differences ΔΦ1, ΔΦ2 and ΔΦ3 of the multi-frequency signals from the base stations; c) acquiring calculation distances (R1, . . . , Rn) based on the phase differences; d) removing phase ambiguity from the calculation distances by using the arrival time; and e) determining the location of the radio beacon based on the calculation distances deprived of the phase ambiguity.

In accordance with one aspect of the present invention, there is provided a system for computing a location of a radio beacon by using time difference of arrival and multiple frequencies, comprising: a plurality of base stations configured to receive signals of multiple frequencies transmitted from the radio beacon, and detect and output phase differences and arrival time; and a location computing server configured to receive the phase differences and the arrival time outputted from the respective base stations, acquire calculation distances based on the phase differences, remove phase ambiguity from the calculation distances based on the arrival time, and compute the location of the radio beacon.

ADVANTAGEOUS EFFECTS

The apparatus and method of the present invention can compute the location of a radio beacon without limitation in distance by receiving signals of multiple frequencies transmitted from the radio beacon at a plurality of base stations and using Time Difference Of Arrival (TDOA) along with phase difference of the multiple frequency signals to remove phase ambiguity from distance acquired from calculation based on phase difference.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. Also, when it is considered that detailed description on a related art to which the present invention pertains may obscure the points of the present invention, the description will not be provided herein. Hereinafter, specific embodiments of the present invention will be described with reference to the accompanying drawings.

Figure 1:
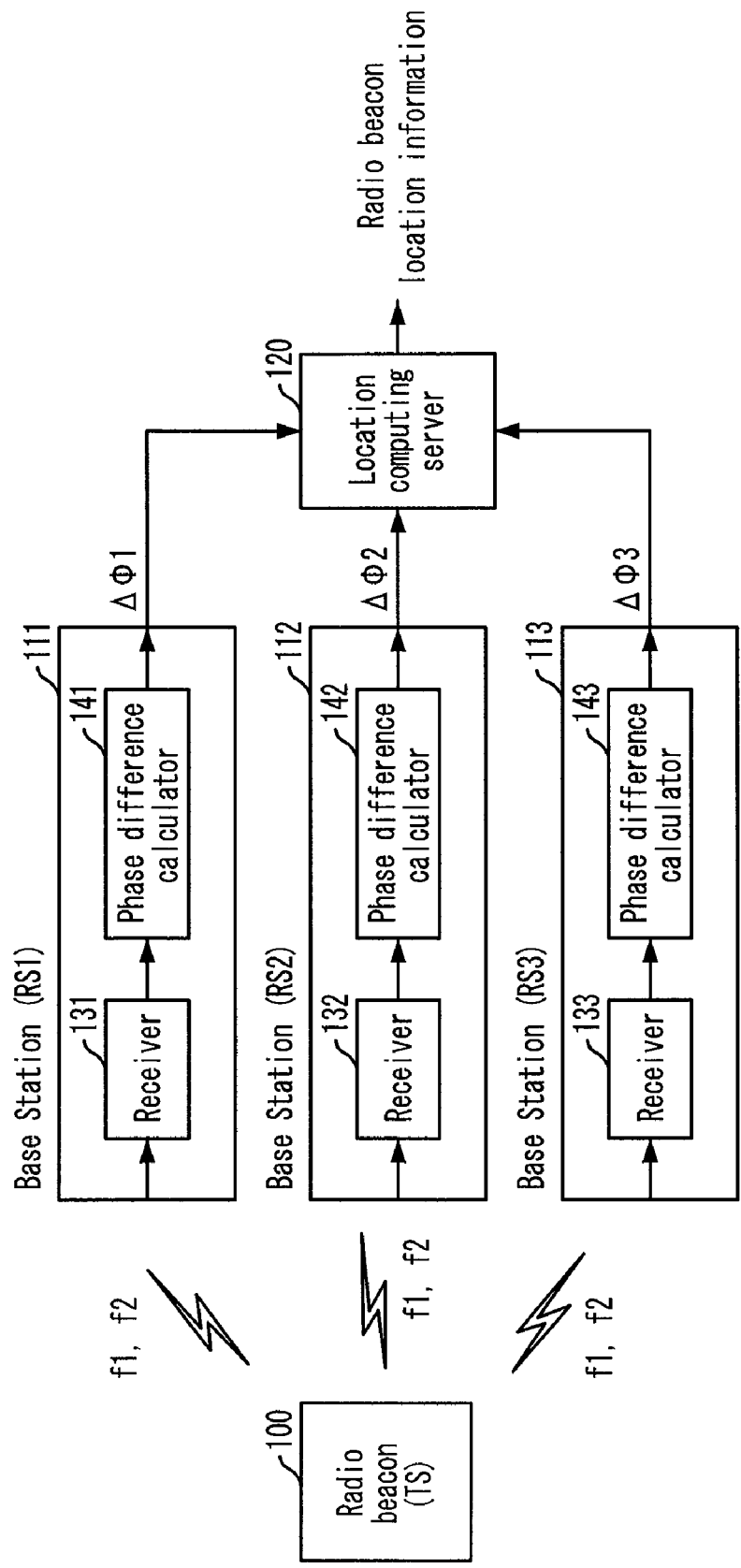
FIG. 1 is an exemplary block view illustrating a typical radio beacon location computing system.
Figure 2:
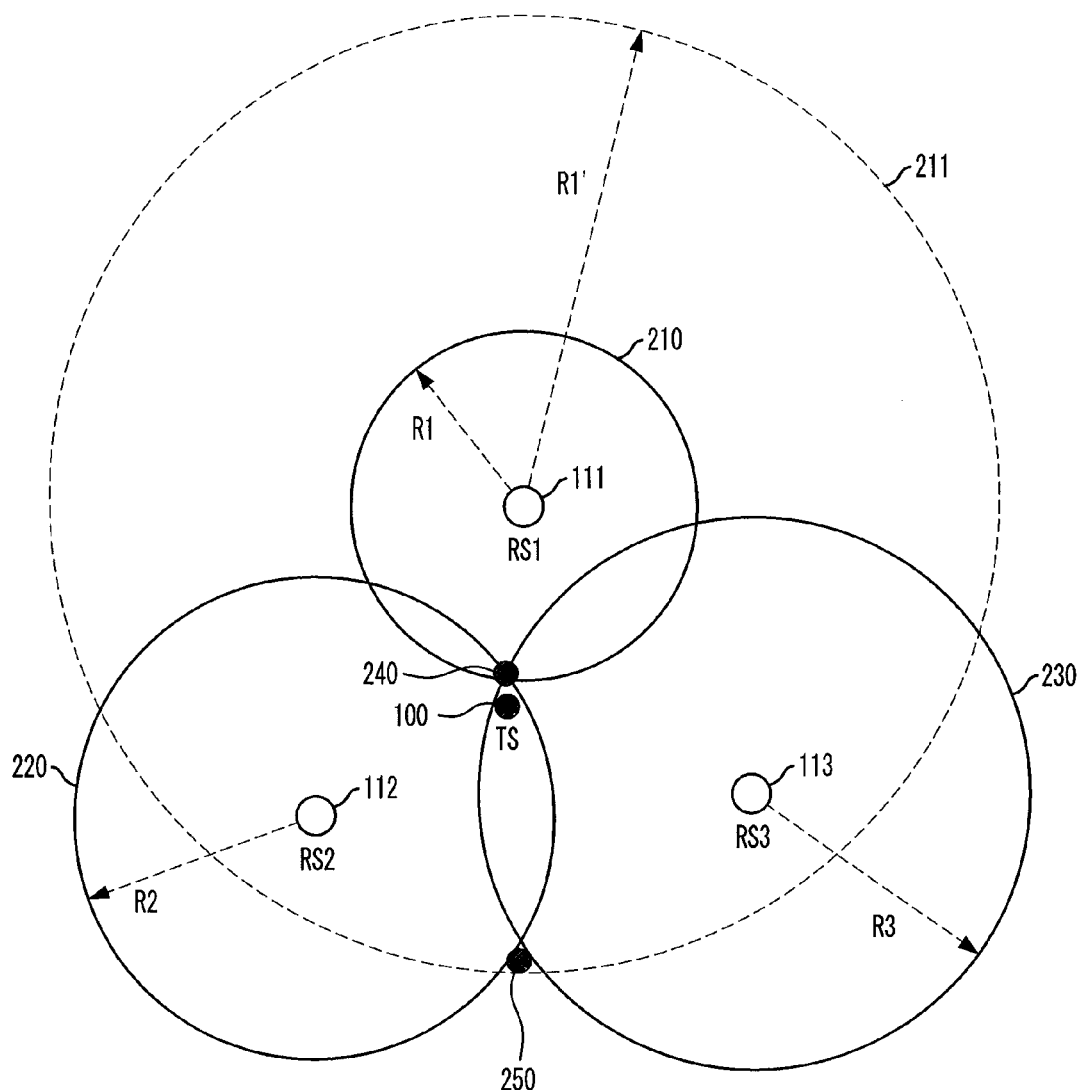
FIG. 2 is an exemplary diagram illustrating ambiguity in location calculation (positioning ambiguity) caused by phase ambiguity.
Figure 3:
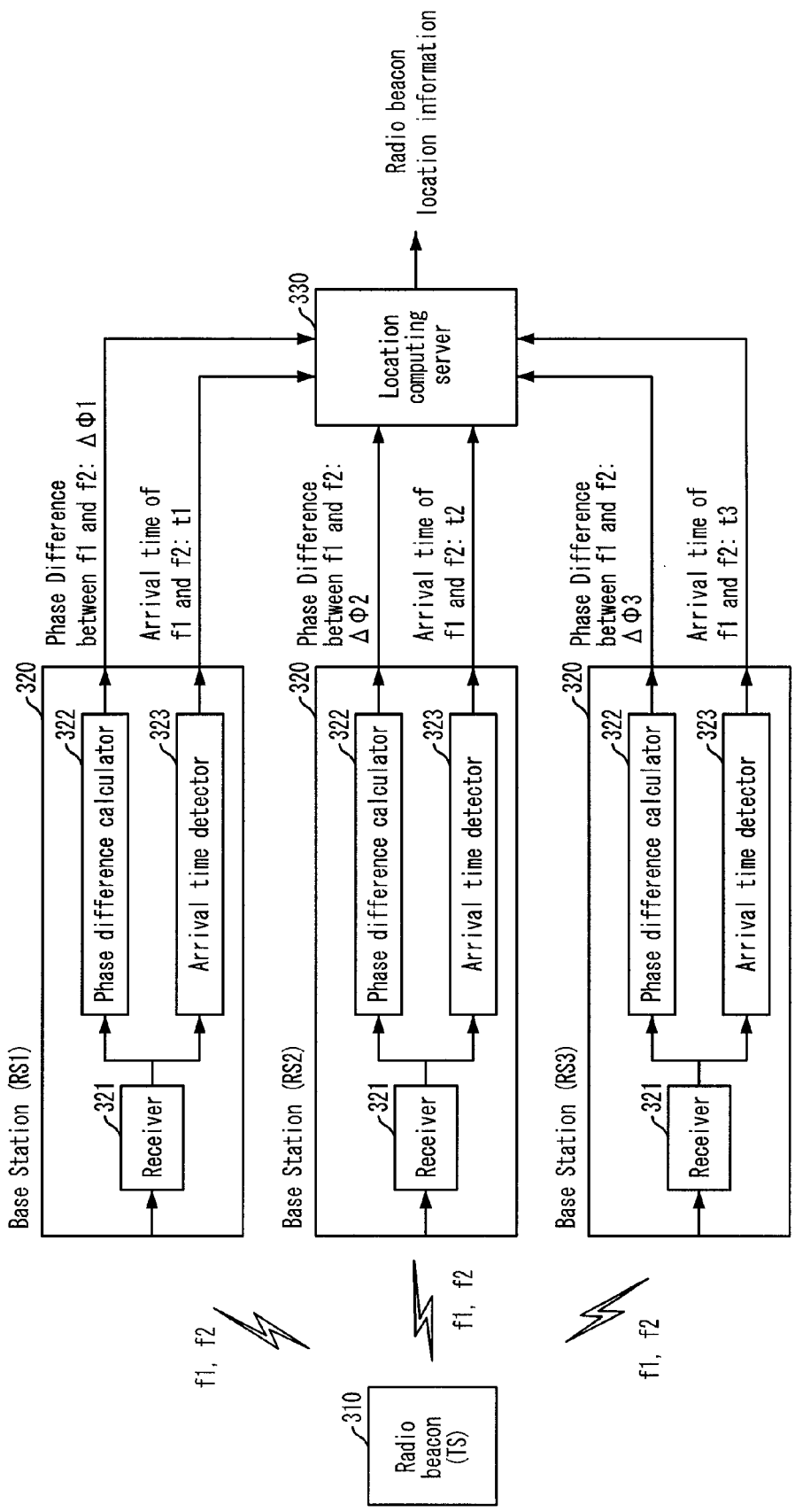
FIG. 3 is an exemplary block view illustrating a radio beacon location computing system using Time Difference Of Arrival (TDOA) and multiple frequencies in accordance with an embodiment of the present invention.

FIG. 3 is an exemplary block view illustrating a radio beacon location computing system using Time Difference Of Arrival (TDOA) and multiple frequencies in accordance with an embodiment of the present invention.

Referring to FIG. 3, the radio beacon location computing system includes a radio beacon (TS) 310, a plurality of base stations RS1, RS2 and RS3 320, and a location computing server 330.

The radio beacon 310 transmits signals in two frequencies f1 and f2.

The base stations 320 receive the signals of two frequencies f1 and f2 transmitted from the radio beacon 310, and detects and outputs phase differences and arrival time of the received signals.

The location computing server 330 receives the phase differences $\Delta\Phi1$, $\Delta\Phi2$ and $\Delta\Phi3$ and arrival time t1, t2 and t3 of the signals transmitted from the base stations RS1, RS2 and RS3 and computes the location of the radio beacon 310.

The base stations 320 include a receiver 321, a phase difference calculator 322, and an arrival time detector 323. The receiver 321 is configured to receive the signals transmitted from the radio beacon 310 through an antenna, modulate the signals, and output the modulated signals. The phase difference calculator 322 calculates phase differences between the signals of the two frequencies f1 and f2 outputted from the receiver 321 based on a frequency interference phenomenon. The arrival time detector 323 receives the signals of the two frequencies f1 and f2 transmitted from the receiver, and detects and outputs the arrival time of the received signals.

Figure 4:
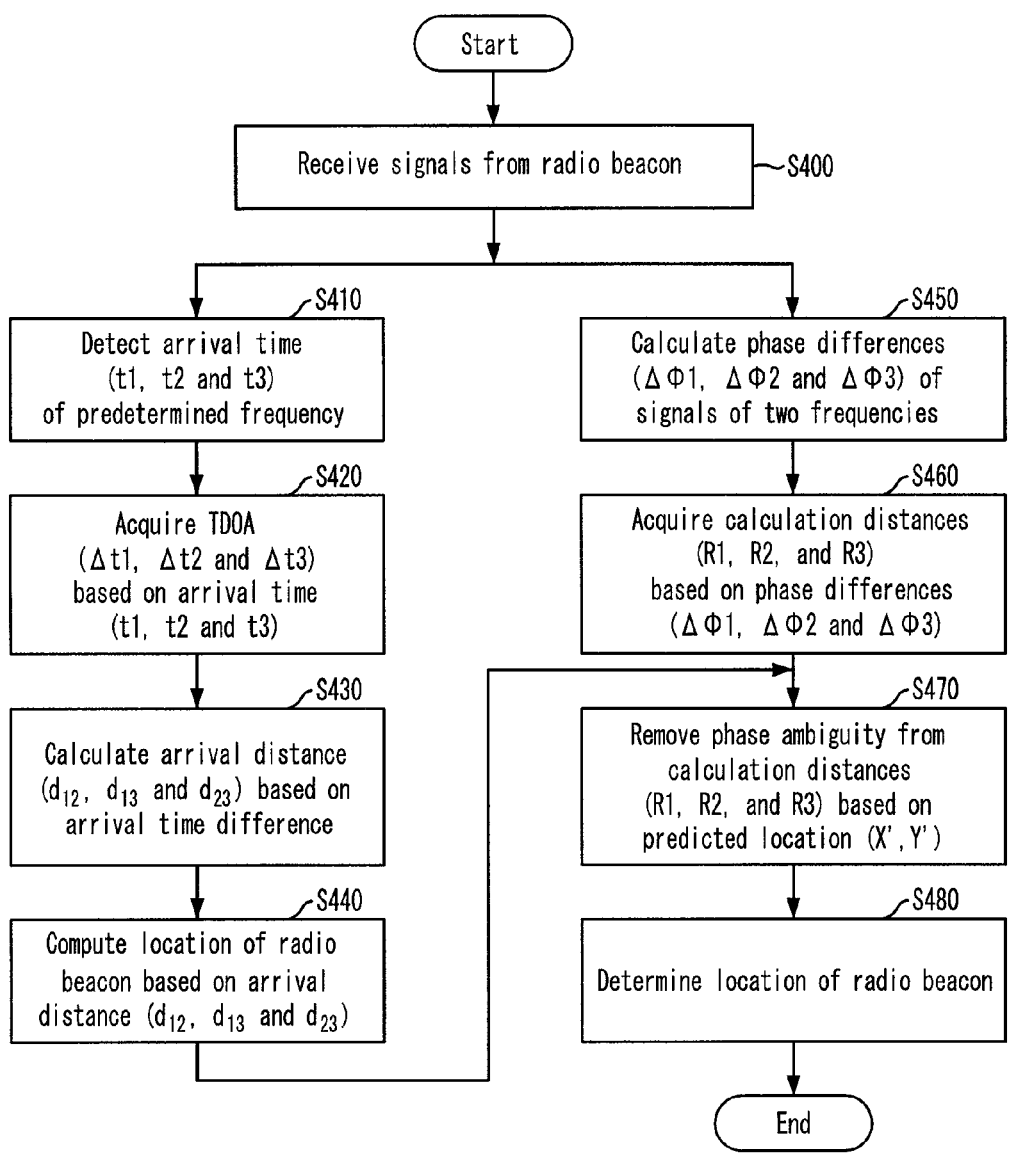
FIG. 4 is a flowchart describing a radio beacon location computing method using time difference of arrival and multiple frequencies in accordance with an embodiment of the present invention.

FIG. 4 is a flowchart describing a radio beacon location computing method using time difference of arrival and multiple frequencies in accordance with an embodiment of the present invention.

At step S400, a plurality of base stations RS1, RS2 and RS3 receive radio signals of two frequencies f1 and f2 are received from a radio beacon.

At step S410, the base stations RS1, RS2 and RS3 detect arrival time t1, t2 and t3 of the received signals, and output the arrival time t1, t2 and t3 to the location computing server. Along with the arrival time t1, t2 and t3, at step S450, phase differences $\Delta\Phi1$, $\Delta\Phi2$ and $\Delta\Phi3$ of the signals of two frequencies are calculated and outputted to the location computing server.

At step S420, the location computing server calculates and acquires time difference of arrival $\Delta t1$, $\Delta t2$ and $\Delta t3$ based on the arrival time t1, t2 and t3 and the following Equation 1.

$$\Delta t1 = t1 - t2$$
$$\Delta t2 = t2 - t3$$
$$\Delta t3 = t3 - t1 \qquad \text{Eq. 1}$$

where t1 denotes arrival time taken for a signal to arrive at a base station RS1; t2 arrival time taken for a signal to arrive at a base station RS1; and t3 arrival time taken for a signal to arrive at a base station RS1.

Subsequently, the location computing server determines a predicted location (X',Y') of the radio beacon by using at least two distances among the distances at step S440.

Meanwhile, the location computing server calculates propagation distances based on the inputted phase differences $\Delta\Phi1$, $\Delta\Phi2$ and $\Delta\Phi3$ along with the steps S420 and S440 and acquires calculation distances R1, R2 and R3 at step S460.

Subsequently, at step S470, the location computing server removes phase ambiguity from the calculation distances R1, R2 and R3 based on the predicted location (X',Y') which is acquired from the predicted distances d1, d2 and d3. The process of removing the phase ambiguity from the calculation distances will be described in detail with reference to FIG. 5.

At step S460, the location computing server determines the location of the radio beacon based on the calculation distances R1, R2 and R3 which are deprived of the phase ambiguity.

Figure 5:
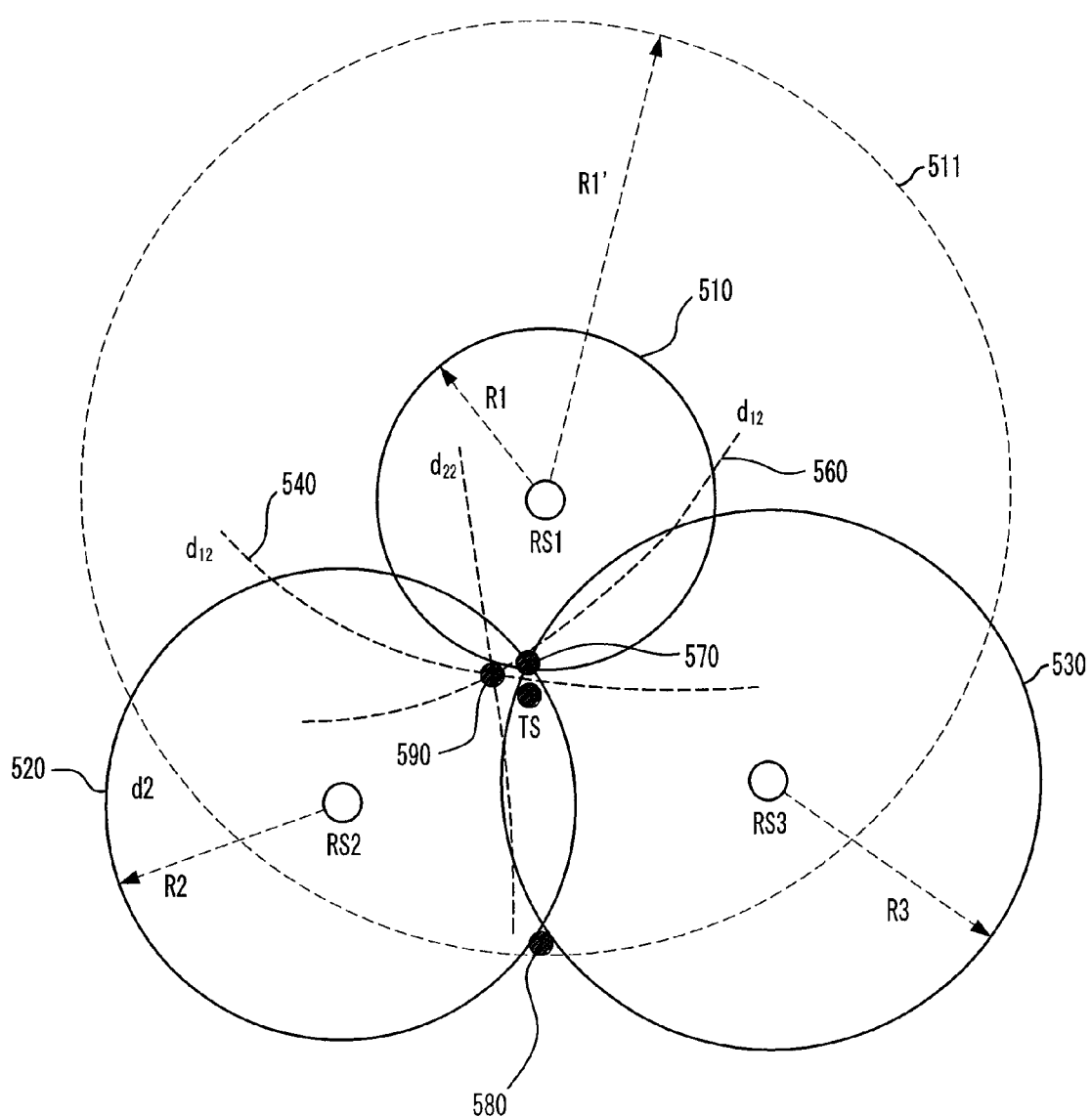
FIG. 5 is an exemplary diagram illustrating a phase ambiguity removing process in accordance with an embodiment of the present invention.

FIG. 5 is an exemplary diagram illustrating a phase ambiguity removing process in accordance with an embodiment of the present invention.

Referring to FIG. 5, the calculation distances R1, R2 and R3 510, 520 and 530 are acquired from calculation based on the measured phase differences $\Delta\Phi1$, $\Delta\Phi2$ and $\Delta\Phi3$. When circles are drawn to have the calculation distances as radiuses, the intersection point where the circumferences of the three circles meet is predicted as the location 570 of the radio beacon.

However, when it is assumed that a base station RS1 has phase ambiguity, the location of the radio beacon may be predicted to be R1' 511 where the phase difference between the two frequencies is $2\pi+\Delta\Phi1$.

Therefore, when a circle having a calculation distance R1' 511 corresponding to $2\pi+\Delta\Phi1$ as a radius is drawn from the base station RS1, a solution is detected at another location 580 where the circles of the calculation distances R2 520 and R3 530 predicted at the base stations RS2 and RS3, respectively, meet.

In short, when it is assumed that the base station RS1 has a phase ambiguity, one of the circles of the calculation distances R1 510 and R1' 511 obtained based on the phase difference $\Delta\Phi1$ should be selected.

Herein, in the present invention, one among the redundant solutions obtained due to the phase ambiguity is selected as a calculation distance based on the predicted location, which is obtained based on the distances acquired from calculation based on the time difference of arrival.

When it is assumed that there are a plurality of solutions due to phase ambiguity in the calculation distances, a calculation distance closer to the predicted location (X',Y') 590 acquired by using the distance is selected. In other words, the phase ambiguity is removed by determining the calculation distance R1 510 which is close to the predicted location (X',Y') 590 is determined as a calculation distance in the present embodiment.

Therefore, the calculation distances from the radio beacon to the base stations RS1, RS2 and RS3 are determined to be R1 510, R2 520 and R3 530, and the location of the radio beacon is determined based on triangulation. To sum up, a point where the three circles formed by the calculation distances R1 510, R2 520 and R3 530 is finally determined as the location 570 of the radio beacon.

The method of the present invention described above may be realized as a program and stored in computer-readable recording media, such as CD-ROM, RAM, ROM, floppy disks, hard disks, magneto-optical disks, and the like. Since the process can be easily implemented by those of ordinary skill in the art to which the present invention pertains, it will not be described in detail herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention is applied to a system for detecting the location of radio beacons.

What is claimed is:

1. A method for computing a location of a radio beacon by using Time Difference Of Arrival (TDOA) and multiple frequencies, comprising the steps of:
    a) receiving arrival time $t_j$ transmitted from each of a plurality of base stations, j ($1<=j<=n$, n is the number of the base stations), wherein each of the base stations, j receives first and second signals respectively having first and second frequencies from the radio beacon, and detects and transmits phase difference $\Delta\Phi_j$ between the first and second signals and the arrival time $t_j$ of a predetermined one of the first and second signals;
    b) receiving the phase difference $\Delta\Phi_j$ from each of the base stations, j;
    c) acquiring calculation distance $R_j$ based on the phase difference $\Delta\Phi_j$ with respect to each base station j, wherein the calculation distance $R_j$ corresponds to a plurality of solution distances;
    d) calculating a predicted location of the radio beacon based on Time Difference Of Arrival (TDOA) ($\Delta t_1, \ldots, \Delta t_n$), wherein $\Delta t_i$ is difference between one pair of arrival times among the arrival times ($t_1, \ldots, t_n$);
    e) removing phase ambiguity from the calculation distance $R_j$ by selecting the closest solution distance to the predicted location of the radio beacon among the plurality of solution distances, with respect to each base station j; and
    f) determining the location of the radio beacon based on the calculation distances ($R_1, \ldots, R_n$) deprived of the phase ambiguity.

2. The method as recited in claim 1, wherein the step d) includes the steps of:
    d1) calculating the Time Difference Of Arrival (TDOA) ($\Delta t_1, \ldots, \Delta t_n$) based on the arrival times ($t_1, \ldots, t_n$);
    d2) calculating distances ($d_{12}, \ldots, d_{1n}$) corresponding to the Time Difference Of Arrival (TDOA) ($\Delta t_1, \ldots, \Delta t_n$); and
    d3) calculating the predicted location of the radio beacon based on the distances ($d_{12}, \ldots, d_{1n}$).

3. The method as recited in claim 2, wherein the step d3) calculates the predicted location of the radio beacon by using at least two distances among the distances ($d_{12}, \ldots, d_{1n}$).

4. The method as recited in claim 1, wherein the step f) determines the location of the radio beacon as a point where circles formed by the calculation distances ($R_1, \ldots, R_n$) meet.

5. A system for computing a location of a radio beacon by using Time Difference Of Arrival (TDOA) and multiple frequencies, comprising:
    a plurality of base stations, wherein each of the base stations, j ($1<=j<=n$, n is the number of the base stations) is configured to receive first and second signals respectively having first and second frequencies transmitted from the radio beacon, and detect and output phase difference $\Delta\Phi_j$ between the first and second signals and arrival time $t_j$ of a predetermined one of the first and second signals; and
    a location computing server configured to:
        receive the phase difference $\Delta\Phi_j$ and the arrival time $t_j$ outputted from each base station j,
        acquire calculation distance $R_j$ based on the phase difference $\Delta\Phi_j$ with respect to each base station j, wherein the calculation distance $R_j$ corresponds to a plurality of solution distances,
        calculate a predicted location of the radio beacon based on Time Difference Of Arrival (TDOA) ($\Delta t_1, \ldots, \Delta t_n$), wherein $\Delta t_i$ is difference between one pair of arrival times among the arrival times ($t_1, \ldots, t_n$),
        remove phase ambiguity from the calculation distance $R_j$ by selecting the closest solution distance to the predicted location of the radio beacon among the plurality of solution distances, with respect to each base station j, and
        compute the location of the radio beacon based on the calculation distances ($R_1, \ldots, R_n$) deprived of the phase ambiguity.

6. The system as recited in claim 5, wherein each of the base stations, j includes:
    a receiver configured to receive signals transmitted from the radio beacon and output the received signals;
    a phase difference calculator configured to calculate and output phase difference $\Delta\Phi_j$ of the received signals; and
    an arrival time detector configured to detect and output the arrival time $t_j$ of the received signals.

7. The system as recited in claim 5, wherein the location computing server calculates the predicted location of the radio beacon based on the distances ($d_{12}, \ldots, d_{1n}$) corresponding to the time difference of arrival (TDOA) ($\Delta t1, \ldots, \Delta tn$).

8. The system as recited in claim 7, wherein the location computing server calculates the predicted location of the radio beacon by using at least two distances among the distances ($d_{12}, \ldots, d_{1n}$).

9. The system as recited in claim 5, wherein the location computing server determines the location of the radio beacon as a point where circles formed by the calculation distances ($R_1, \ldots, R_n$) meet.

* * * * *